United States Patent Office 3,551,456
Patented Dec. 29, 1970

3,551,456
ACETYL DERIVATIVES OF SUBSTITUTED
CHROMANS AND COUMARANS
Herman S. Bloch, Skokie, Ill., assignor to Universal Oil
Products Company, Des Plaines, Ill., a corporation of
Delaware
No Drawing. Filed Apr. 18, 1968, Ser. No. 722,146
Int. Cl. C07d 5/36, 7/20
U.S. Cl. 260—345.2                                    6 Claims

ABSTRACT OF THE DISCLOSURE

Acetyl derivatives of substituted chromans and coumarans which are prepared by condensing a phenolic compound with a dienic hydrocarbon and thereafter acetylating the resultant compound are useful as components of aroma compositions of matter.

---

This invention relates to novel compositions of matter of a type hereinafter set forth in greater detail and to a method for the preparation thereof. More specifically, the invention is concerned with novel compounds comprising acetyl derivatives of substituted chromans and coumarans and to a method for preparing these compounds. The novel compositions of matter of the present invention possess desirable characteristics which will render them highly valuable as ingredients in the preparation of perfumes and other aroma compositions of matter. Many compositions of matter which possess desirable aromas, including lavandin, lavender oils, geraniol, etc., require certain compounds which are utilized to stimulate or extend the odors of these highly valuable naturally occurring or synthetic scents, compounds such as musk having been utilized as fixatives for these oils. However, it is desirable to prepare synthetic compounds which will possess musk-like properties, thereby eliminating the necessity for depending upon musk which is naturally occurring inasmuch as the naturally occurring musk may not always be consistent in its fixative property. In addition, the source of supply of naturally occurring musk may vary from time to time and therefore the aroma manufacture will be dependent upon a varying or fluctuating source of supply. By utilizing synthetically prepared compounds which possess musk-like properties, it is possible to insure a manufacture of a constant supply of this material. In this respect, it has now been discovered that novel compositions of matter of the type hereinafter set forth which possess musk-like properties may be prepared by a process also hereinafter set forth in greater detail.

The novel composition of matter of this invention may then be used in perfumery, either individually or in admixture, as fixative ingredients of perfumes. As used herein, the term "perfume" will connote a mixture of organic compounds including, for example, alcohols, aldehydes, ketones, esters, and frequently, also hydrocarbons which are combined in fixed proportions so that the odors of the individual compounds will combine to produce a harmonious and pleasing fragrance. Perfumes which also contain the compounds of the present invention which are utilized to fix the odor may be used per se or incorporated into cosmetic items such as creams, soaps, talcum powders, colognes, or other toilet goods such as shampoos as well as synthetic detergents to produce products which possess desirable commercial fragrance properties.

It is therefore an object of this invention to provide novel compositions of matter which possess useful musk-like properties and may be incorporated as derivatives for other compounds which possess desirable fragrances or odors.

Another object of this invention is to provide a process for preparing the aforementioned novel compositions of matter which possess these useful properties.

In one aspect an embodiment of this invention resides in an alkyl substituted acetylchroman or coumaring having a structural formula:

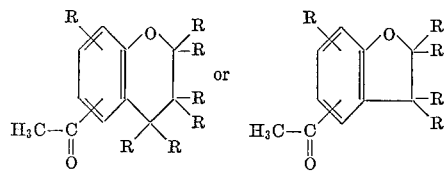

in which each R is independently selected from the group consisting of hydrogen and lower alkyl radicals containing from 1 to about 4 carbon atoms, at least 1 of said R's being alkyl.

Another embodiment of this invention is found in a process for preparing an alkyl substituted acetylchroman or acetylcoumaran which comprises condensing a phenolic compound with a conjugated dienic hydrocarbon in the presence of an acid-acting catalyst at a temperature in the range of from about ambient to about 200° C. and a pressure in the range of from about atmospheric to about 1000 pounds per square inch, thereafter treating the resultant substituted chroman or coumaran with an acetylating agent in the presence of an acid-acting catalyst at ambient temperature and atmospheric pressure, and recovering the resultant alkyl substituted acetyl chroman or coumaran.

A specific embodiment of this invention resides in 2,2-dimethyl-6-acetylchroman.

Yet another embodiment of this invention resides in a process for preparing an alkyl substituted acetylchroman or acetylcoumaran which comprises condensing a phenol with 2-methyl-1,3-butadiene in the presence of solid phosphoric acid at a temperature in the range of from about ambient to about 200° C. and a pressure in the range of from about atmospheric to about 2000 pounds per square inch, thereafter treating the resultant compounds with acetylchloride in the presence of aluminum chloride at ambient temperature and atmospheric pressure, and recovering the resultant 2,2-dimethyl-6-acetylchroman and 2,2,3-trimethyl-5-acetylcoumaran.

Other objects and embodiments will be found in the following further detailed description of the present invention.

As hereinbefore set forth, the present invention is concerned with novel compositions of matter which possess musk-like properties, said compounds comprising acetyl derivatives of alkyl substituted chromans and coumarans. These compounds are prepared by condensing a phenolic compound with a conjugated dienic hydrocarbon in the presence of an acid-acting catalyst and thereafter acylating the resultant compound in the presence of an acid-acting catalyst with an acetylating agent to prepare the desired compounds. Examples of phenolic compounds which may be utilized as starting materials in the process of this invention will include phenol, o-cresol, m-cresol, p-cresol, o-ethylphenol, m-ethylphenol, p-ethylphenol, o-propylphenol, m-propylphenol, p-propylphenol, o-isopropylphenol, m-isopropylphenol, p-isopropylphenol, 2,4-dimethylphenol, 2,4-diethylphenol, 2,4-dipropylphenol, 2,3-dimethylphenol, 2,3-diethylphenol, 2,5-dimethylphenol, 2,5-diethylphenol, etc. Conjugated dienic hydrocarbons which are to be condensed with the aforementioned phenolic compounds will contain from about 4 up to about 10 carbon atoms in length and will include 1,3-butadiene, hereinafter referred to as butadiene, 2-methyl-1,3-butadiene (isoprene), 2,3-dimethyl-1,3-butadiene, 1,3-pentadiene, 1,3-hexadiene, 2,4-hexadiene, 2-methyl-1,3-pentadiene, 2,3-dimethyl-1,3-pentadiene, 2-methyl-1,3-hexadiene, 2,3-dimethyl-1,3-hexadiene, etc. It is to be understood that the aforementioned phenolic compounds and conjugated dienic hydrocarbons are only representative of the classes of compounds which may be used and that the present invention is not necessarily limited thereto.

The condensation of the aforementioned phenolic compounds and conjugated dienic hydrocarbons will be effected at a temperature ranging from ambient (about 25° C.) up ot about 200° C. and at a pressure in the range of from about atmospheric to about 1000 pounds per square inch, the amount of pressure which is utilized being that which is required to maintain a major portion of the reactants in the liquid phase. Other reaction conditions which will be used will include a mole raito of reactants in which the phenolic compound is present in a molar excess over that of the dienic hydrocarbon, said ratio ranging from about 1.1:1 up to about 4:1 moles of phenolic compound per mole of dienic hydrocarbon. Yet another reaction condition for continuous reaction will include space velocities, the reaction being effected at a liquid hourly space velocity in a range of from about 1 up to about 10 or more, the preferred space velocity being from about 4 to about 7.

The condensation is effected in the presence of an acid-acting catalyst. Examples of these catalysts which may be used include mineral acids such as liquid phosphoric acid; sulfuric acid; hydrogen fluoride; a solid acid known in the trade as Solid Phosphoric Acid which is a calcined composite of kieselguhr with a phosphoric acid such as polyphosphoric acid, tetraphosphoric acid, triphosphoric acid, phosphorus-pentoxide or mixtures thereof; composites of phosphoric acid with a support comprising silica, alumina, or mixtures thereof, etc. In addition, it is also contemplated that the condensation catalyst may comprise a Friedel-Crafts metal halide compound such as aluminum chloride, aluminum bromide, ferric chloride, zinc chloride, etc., or strong organic acids such as toluene-sulfonic acid, methanesulfonic acid, and the like.

The resultant compounds which comprise an alkyl substituted chroman or coumaran, and which possess the generic formula:

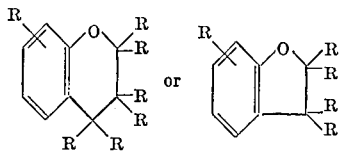

in which each R is independently selected from the group consisting of hydrogen and lower alkyl radicals containing from 1 to about 4 carbon atoms, at least 1 of said R's being an alkyl radical, are then acetylated by treatment with an acetylating agent at ambient temperature and atmospheric pressure. The reaction, in which the substituted chromans or coumarans and the acetylating agent are present in a mole ratio of about 0.5:1 to about 2:1 moles of chroman or coumaran per mole of acetylating agent, is effected in the presence of an acid-acting catalyst which is present in catalytic amounts. Examples of acid-acting catalysts which may be used include sulfuric acid, phosphoric acid, aluminum halides such as aluminum chloride, aluminum bromide, etc. The acetylating agent which is used in the process of this invention will include acetyl halides such as acetyl chloride, acetyl bromide, or other compounds such as acetic anhydride, etc.

Examples of alkyl substituted acetylchromans or coumarans having the structural formula:

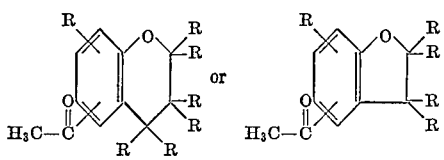

in which R is selected from the group consisting of hydrogen and loweralkyl radicals containing from 1 to about 4 carbon atoms, at least 1 of said R's being alkyl will include 2,2,3-trimethyl - 6 - acetylchroman, 2,2,3,3-tetramethyl-5-acetylcoumaran, 2,2 - dimethyl-6-acetylchroman, 2,2,3 - trimethyl-5-acetylcoumaran, 2,2,3,6-tetramethyl-7-acetylchroman, 2,2,3,3,5 - pentamethyl-6-acetylchroman, 2,2,3 - trimethyl-6-ethyl-7-acetylchroman, 2,2,3,3 - tetramethyl-5-ethyl - 6 - acetylcoumaran, 2,2,3-trimethyl-6-propyl-7-acetylchroman, 2,2,3,3-tetramethyl - 5 - propyl-6-acetylcoumaran, 2,2,5,6 - tetramethyl-7-acetylchroman, 2,2,3,4,5-pentamethyl-6-acetylcoumaran, etc. It is to be understood that the aforementioned compounds are only representative of the class of compounds which may be prepared, and that the present invention is not necessarily limited thereto.

The process of this invention may be effected in any suitable manner and may comprise either a batch or continuous type operation. For example, when a batch type operation is used a quantity of the acid-acting catalyst is placed in an appropriate apparatus such as a condensation flask which is provided with heating, cooling and stirring means. The phenolic compound is placed in the flask and the dienic hydrocarbon is then charged thereto while maintaining the vessel and contents thereof at the predetermined operating temperature. The dienic hydrocarbon is charged to the flask during a period of about 15 minutes to an hour or more, the rate of addition being such as to prevent overheating from the exothermic reaction. Upon completion of the desired reaction time after addition of the diene, which may range from about 0.5 up to about 10 hours of more in duration, the reaction product is recovered. The product is then subjected to conventional means of separation such as distillation under reduced pressure, extraction with an alkali, acidification, etc. in order to separate the desired products comprising substituted chromans and coumarans from unreacted starting materials and/or by-products which are formed during the reaction.

The desired alkyl substituted chromans and coumarans which have been prepared according to the above paragraph are then placed in another reaction vessel along with an acid-acting catalyst of the type hereinbefore set forth. The acetylating agent such as acetyl chloride, acetic anhydride, etc. is then added to the vessel and the reaction is allowed to proceed for a residence time which may be similar in nature to that required for the first step of the process, that is, from about 0.5 up to about 10 hours or more. After continuously stirring the mixture for the predetermined period of time, the reaction mixture is recovered and also subjected to separation means such as fractional distillation, crystallization, and the like. The desired product which comprises alkyl substituted acetylchromans or alkyl substituted acetylcoumarans is separated from the unreacted starting material and recovered.

It is also contemplated within the scope of this invention that the process for preparing the novel compositions of matter of the present invention may be effected in a continuous manner of operation. When such a type of operation is used, an appropriate apparatus vessel is maintained at the desired operation conditions of temperature and pressure, said vessel containing an acid-acting catalyst such as a Friedel-Crafts metal halide, Solid Phosphoric Acid, or a mineral acid. The reactants comprising the phenolic compound and the dienic hydrocarbon are continuously charged to the reactor through separate lines, or, if so desired, may be admixed prior to entry into said reactor and charged thereto in a single stream, such addition being made at such a rate as to maintain the liquid hourly space velocity of the reactor within the aforementioned range. After a predetermined residence time has elapsed, the reactor effluent is continuously withdrawn and subjected to separation steps whereby the desired alkyl substituted chromans and alkyl substituted coumarans are separated from any unreacted starting material and/or side products. The unreacted starting materials are recycled to form a portion of the feed stock while the alkyl substituted chroman and the alkyl substituted coumaran are charged to a second reactor which also contains an acid-acting catalyst. The acetylating agent is also continuously charged to this second reactor and the acetylating action allowed to proceed in a manner similar to that for the first step of this process. After completion of the desired residence time for the acetylating step, the reactor effluent is also continuously withdrawn and subjected to separation steps whereby the alkyl substituted acetylchroman and alkyl substituted acetylcoumaran are separated from any unreacted starting materials, the latter being recycled to form a portion of the feed stock in the second step of the process, while the former is recovered.

When utilizing a solid catalyst such as a supported Friedel-Crafts metal halide or Solid Phosphoric Acid it is possible to effect a continuous type of operation in a fixed bed process. In this type of operation the catalyst is disposed as a fixed bed in the reaction zone while the reactants are passed through said bed in either an upward or downward flow. Another type of operation which may be effected when utilizing a solid catalyst is the moving bed type of operation in which the bed of catalyst and the reactants are passed through said reaction zone either concurrently or countercurrently to each other, or the slurry type operation in which the catalyst is carried into the reaction zone as a slurry in one of the reactants.

The following examples are given to illustrate the process of the present invention which, however, are not intended to limit the generally broad scope of the present invention in strict accordance therewith.

EXAMPLE I

In this example 100 cc. of a Solid Phosphoric Acid catalyst was placed in a stainless steel tube surrounded by an electrically heated furnace containing an aluminum block. 1400 grams of phenol were melted and poured into a three-liter charger; and after resealing the charger, 762 grams of butadiene were charged thereto from a small pressure vessel. After being shaken and allowed to stand for a period of 16 hours, the mixture was considered homogeneous. The reactor was then heated to a temperature of about 130° C. while the phenol-butadiene mixture was charged thereto at a space velocity of 7.4. In addition, the reactor was maintained at 100 pounds per square inch of pressure during the reaction period, which took a time of approximately 3 hours. During this time, the reaction product was discharged from the bottom of the catalyst tube into a three-liter flask, which served also as a separator, with the gaseous products passing on to gas traps which were cooled in a Dry Ice-acetone mixture. The liquid product was vacuum distilled to remove the dissolved unreacted butadiene and phenol. The liquid fractions were extracted with a 10% aqueous sodium hydroxide solution and thereafter with Claisen's alkali solution. The alkali-insoluble portion was distilled under reduced pressure whereby the desired product comprising 2-methylchroman and isomers thereof, including 3-methylchroman, 2,3-dimethyl-coumaran and 3-ethylcoumaran, were recovered.

The methylchromans and alkylcoumarans which were prepared according to the above paragraph are then acetylated by placing one molar proportion of the methylchromans and alkylcoumarans with one molar proportion of acetyl chloride in a reaction flask which contains 67 grams of aluminum chloride. The reaction mixture is stirred constantly for a period of about 4 hours while maintaining the reaction flask at ambient temperature and atmospheric pressure. Upon completion of the aforementioned residence time, the catalyst is removed by water-washing and the reaction mixture is then subjected to fractional distillation under reduced pressure whereby the unreacted chromans and coumarans are separated from the desired products which comprise 6-acetyl-methylchromans and 5-acetylalkylcoumarans, which have a musk-like scent.

EXAMPLE II

In this example a mixture of 188 grams (2.0 mole) of phenol and 68 grams (1.0 mole) of isoprene are admixed and thereafter charged to a reaction vessel which contains 50 grams of a Solid Phosphoric Acid catalyst. The reaction vessel is maintained at a temperature of about 130° C. and a pressure of about 100 pounds per square inch for about 3.5 hours. The reaction mixture is then withdrawn and treated in a manner similar to that set forth in Example I above. The alkali-insoluble material which is recovered from the treatment is subjected to fractional distillation under reduced pressure, the desired compounds comprising dimethylchromans and trimethylcoumarans being recovered therefrom.

The alkylchromans and coumarans which have been prepared according to the above paragraph are then placed in a reaction flask along with an equimolar proportion of acetic anhydride. In addition, the reaction vessel will also contain a catalytic amount of sulfuric acid in acetic acid. The reaction mixture is thoroughly mixed by means of a mechanical stirrer and maintained in an agitated state for a period of about 4 hours. At the end of this time, agitation is discontinued, the reaction mixture is recovered and the catalyst removed. The mixture is then subjected to fractional distillation under reduced pressure whereby the desired product including 2,2-dimethyl-6-acetylchroman and 2,2,3-trimethyl-5-acetylcoumaran are recovered.

EXAMPLE III

In this example 324 grams (3.0 mole) of m-cresol is stirred and admixed with 2,3-dimethyl-1,3-butadiene. The resulting mixture is charged to a reaction vessel which contains 50 cc. of Solid Phosphoric Acid catalyst at a liquid hourly space velocity of about 4.5. The reaction vessel during the addition of the charge is maintained at a temperature of about 150° C. and a pressure of 100 pounds per square inch. The reaction mixture is recovered and treated in a manner similar to that set forth in Example I above, that is, by being distilled under vacuum to remove the unreacted cresol and 2,3-dimethyl-1,3-butadiene. Following this, the liquid fractions are extracted with an aqueous alkali solution and the alkali-insoluble portion is recovered. This portion is then subjected to fractional distillation under reduced pressure whereby the desired products comprising 2,2,3,7-tetramethylchroman and 2,2,3,3,6-pentamethylcoumaran are recovered.

The polymethyl substituted chromans and polymethyl substituted coumarans which are prepared according to the above paragraph are then placed in a flask along with an equimolar proportion of acetyl chloride. In addition, the flask contains a catalytic amount of aluminum chloride as the acetylation catalyst. The reaction is continuously agitated by means of a mechanical stirrer for a period of about 4 hours while maintaining the operating conditions at slightly above ambient temperature and atmospheric pressure. At the end of this reaction time, the mixture is recovered, the catalyst removed, and the products subjected to fractional distillation under reduced pressure. From the distillation, the desired products are recovered, comprising 2,2,3,7-tetramethyl-6-acetylchroman and 2,2,3,3,6-pentamethyl-5-acetylcoumaran.

EXAMPLE IV

In this example 188 grams (2.0 mole) of phenol and 82 grams (1.0 mole) of 2,3-dimethyl-1,3-butadiene are admixed in a pressure vessel and thereafter charged to a reactor which contains 25 cc. of a sulfuric acid catalyst. The phenol-butadiene mixture is charged to the reactor during a period of one hour, while the reactor is maintained at a temperature of about 65° C. Upon completion of the charge, the mixture is allowed to react for an additional period of about 1 hour. At the end of this time, the reaction mixture is recovered, the catalyst removed, and the products distilled under vacuum to recover any unreacted phenol and 2,3-dimethylbutadiene. The residue is extracted with a 10% aqueous sodium hydroxide solution. The alkali-insoluble product is subjected to fractional distillation under reduced pressure whereby the desired product comprising 2,2,3-trimethylchroman and 2,2,3,3-tetramethylcoumaran are recovered. The alkylchromans and coumarans are then placed in a reaction vessel along with an equimolar proportion of acetic anhydride, said reaction vessel also containing a catalytic amount of aluminum chloride. The mixture is thoroughly agitated for a period of about 4 hours at ambient temperature and atmospheric pressure. At the end of this 4 hour time period, the mixture is again washed and thereafter subjected to fractional distillation at reduced pressure, whereby unreacted starting materials are removed while the desired products 2,2,3-trimethyl-6-acetylchroman and 2,2,3,3-tetramethyl-5-acetylcoumaran are recovered.

I claim as my invention:

1. An alkyl substituted acetylchroman or coumaran having a structural formula:

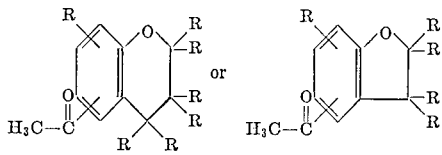

in which each R is independently selected from the group consisting of hydrogen and lower alkyl radicals containing from 1 to about 4 carbon atoms, at least 1 of said R's being alkyl.

2. The compound of claim 1 being 2,2-dimethyl-6-acetylchroman.

3. The compound of claim 1 being 2,2,3,7-tetramethyl-6-acetylchroman.

4. The compound of claim 1 being 2,2,3-trimethyl-5-acetylcoumaran.

5. The compound of claim 1 being 2,2,3,3,6-pentamethyl-5-acetylcoumaran.

6. The compound of claim 1 being 2,2,3-trimethyl-6-acetylchroman.

References Cited

UNITED STATES PATENTS

| | | | |
|---|---|---|---|
| 2,033,548 | 3/1936 | Ralston et al. | 260—346.2 |
| 2,189,383 | 2/1940 | Ralston et al. | 260—346.2X |
| 2,320,746 | 6/1943 | Paul | 260—346.2X |
| 2,849,459 | 8/1958 | Leary et al. | 260—346.2X |

HENRY R. JILES, Primary Examiner

J. M. FORD, Assistant Examiner

U.S. Cl. X.R.

260—346.2; 252—522